United States Patent [19]

Huberman

[11] Patent Number: 6,078,906
[45] Date of Patent: Jun. 20, 2000

[54] METHOD AND SYSTEM FOR PROVIDING A DOCUMENT SERVICE OVER A COMPUTER NETWORK USING AN AUTOMATED BROKERED AUCTION

[75] Inventor: Bernardo A. Huberman, Palo Alto, Calif.

[73] Assignee: Xerox Corporation, Stamford, Conn.

[21] Appl. No.: 09/173,908

[22] Filed: Oct. 16, 1998

Related U.S. Application Data

[63] Continuation of application No. 08/518,632, Aug. 23, 1995, Pat. No. 5,826,244.

[51] Int. Cl.$^7$ .................................................. G06F 17/60
[52] U.S. Cl. .............................. 705/37; 705/26; 705/35
[58] Field of Search ................................. 705/26, 35, 37, 705/28, 36, 39, 40, 42, 44; 235/61 M; 340/825.3; 379/88, 92

[56] References Cited

U.S. PATENT DOCUMENTS

| Re. 32,115 | 4/1986 | Lockwood et al. ...................... 235/381 |
| 3,581,072 | 5/1971 | Nymeyer .................................... 705/37 |
| 4,567,359 | 1/1986 | Lockwood ............................... 235/381 |
| 4,799,156 | 1/1989 | Shavit et al. .............................. 705/26 |
| 4,839,829 | 6/1989 | Freedman ................................ 345/329 |
| 5,243,515 | 9/1993 | Lee ............................................ 705/37 |
| 5,287,194 | 2/1994 | Lobiondo ................................. 358/296 |
| 5,339,168 | 8/1994 | Evanitsky et al. ....................... 358/402 |
| 5,394,324 | 2/1995 | Clearwater .................................. 705/8 |
| 5,826,244 | 10/1998 | Huberman ................................ 705/37 |

FOREIGN PATENT DOCUMENTS

| 2-118876 | 5/1990 | Japan . |
| 3-1274 | 1/1991 | Japan . |

OTHER PUBLICATIONS

Engelbrecht–Wiggans, Shubik and Stark, editors. "Auctions, Bidding, and Contracting: Uses and Theory". New York: New York University Press; 1983; pp. 3–31, 53–103.

Xerox Product literature on InterDoc Software (1995). Williams, M.E. "The Next Bid Thing". Wired, Sep. 1995, pp. 51 & 54.

Myerson, R.B. "Game Theory. Analysis of Conflict". Harvard University Press, 1991, pp. 483–536.

CommerceNet background information document (1994–1995). "CommerceNet: The First Large–Scale Market Trial of Electronic Commerce on the Internet", Obtained on Aug. 21, 1995 from Internet World Wide Web page http://www.commerce.net/information/background.html.

Agorics, Inc. home page doucment. Obtained on Aug. 21, 1995 from Internet FTP site ftp://ftp.netcom.com/pub/ag/agorics/agorics.html.

Agorics, Inc. profile document. Obtained on Aug. 21, 1995 from Internet FTP site ftp://ftp.netcom.com/pub/ag/agorics/profile.html.

(List continued on next page.)

*Primary Examiner*—Stephen R. Tkacs

[57] ABSTRACT

A system and method to enable and facilitate networked, automated, brokered auctioning of document services. A plurality of processes are executed, including a customer process representing a customer, a supplier process representing a supplier, and a broker process capable of serving as an intermediary between the customer and supplier processes. The broker process is provided with a description of a document service. Responsively to the description thus provided, an auction for the document service is conducted, as follows: A customer or supplier process submits a bid for the document service. The broker process receives bidding information including the submitted bid. The broker process attempts to establish a price for the document service responsively to the received bidding information and, if a price can be established, establishes the price. If a price is established, the broker process proposes a transaction wherein the document service is to be provided at the established price. If the proposed transaction is accepted, it can proceed automatically.

21 Claims, 6 Drawing Sheets

OTHER PUBLICATIONS

Xerox Press Release, 'Xerox Unveils "Electronic Storefront' for Printers, InterDoc software uses the Internet to create new market opportunity for printers", New York, Jun. 27, 1995.

Verity, J.W. "Truck Lanes for the Info Highway". Business Week, Apr. 18, 1994, pp. 112–114.

Wildstrom, S.H. Editor. "In Search of the Paperless Contract". Business Week, Aug. 29, 1994. p. 14.

Gross, J.R. "Around the World—Instantaneously". Business Documents. Oct. 1994.

Waldspurger, C.A.; Hogg, T.; Huberman, B.A.; Kephart, J.O.; Stornetta, W.S. "Spawn: A Distributed Computational Economy". IEEE Transactions on Software Engineering, vol. 18, No. 2, Feb. 1992. pp. 103–117.

Huberman, B.A.; Hogg, T. "Distributed Computation as an Economic System". Journal of Economic Perspectives, vol. 9, No. 1, Winter 1995, pp. 141–152.

Miller, M.S.; Drexler, K.E. "Markets and Computation: Agoric Open Systems". The Ecology of Computation, Editor Huberman, B.A. 1988. pp. 133–176.

Malone, T.W.; Fikes, R.E.; Grant, K.R.: Howard, M.T. "Enterprise: A Market–like Task Scheduler for Distributed Computing Environments". The Ecology of Computation, Editor Huberman, B.A. 1988 pp. 177–205.

Gagliano, R.A.; Fraser, M.D.; Scahefer, M.E. "Simulation of a Market Model for Distributed Control". Record of Proceedings, The $21^{st}$ Annual Simulation Symposium, Mar. 16–18, 1988, Tampa, Florida. pp. 171–187.

Fraser, M.D.; Gagliano, R.A.; Schaefer, M.E. "The Simulation of a Distributed Control Model for Resource Allocation and the Implied Pricing". Record of Proceedings, The $22^{nd}$ Annual Simulation Symposium, Mar. 28–31, 1989, Tampa, Florida. pp. 81–92.

Fraser, M.D.; Gagliano, R.A.; Schaefer, M.E. "Modeling the Cost of Resource Allocation in Distributed Control". Record of Proceedings, The $23^{rd}$ Annual Simulation Symposium, Apr. 23–27, 1990, Nashville, Tennessee. pp. 151–164.

Kurose, J.F.; Simha, R. "A Microeconomic Approach to Optimal Resource Allocation in Distributed Computer System". IEEE Transactions on Computers, vol. 38, No. 5, May. 1989. pp. 705–717.

Kurose, J.F.; Schwarts, M.; Yemini, Y. "A Microeconomic Approach to Decentralized Optimization of Channel Access Policies in Multiaccess Networks". IEEE publication, 1985. pp. 70–77.

Inoue, S.; Matsumoto, T. "A Note on Anonymous Electronic Auction". Technical Report of the Institute of Electronics, Information and Communication Engineers, May 1995. pp. 31–38.

METHOD AND SYSTEM FOR PROVIDING A DOCUMENT SERVICE OVER A COMPUTER NETWORK USING AN AUTOMATED BROKERED AUCTION

INCORPORATION BY REFERENCE

This application is a continuation of application Ser. No. 08/518,632, filed Aug. 23, 1995, now U.S. Pat. No. 5,826,244. The following U.S. patent is fully incorporated herein by reference: U.S. Pat. No. 5,287,194 (Lobiondo, "Distributed Printing").

BACKGROUND OF THE INVENTION

This invention relates to distributed document services and, more particularly, to commercial distributed document services delivered using electronic networks. Document services can include, for example, printing, copying, scanning, interpretation, text and image recognition, editing, reproduction, binding, colorization, transmission (e.g., by facsimile or by electronic mail), mailing, storage (e.g., in microphotographic or digital form), retrieval, format conversion, authentication, searching (e.g., within a document or in a database of documents), shredding, recycling, disposal, and many others.

With the explosive growth of the Internet and, more generally, of electronic networks for computing and communication, it has become possible to conduct commercial transactions in a purely electronic forum. Conventional business transactions, as practiced in the non-electronic, non-networked world, can be emulated and sometimes automated or partially automated in the new electronic, networked world. Also, entirely new kinds of commerce can become possible—if they can be envisioned, and if mechanisms and techniques can be developed to enable and facilitate them.

A well-known commercial mechanism that is beginning to find its way into the new world of electronic networks is the auction. In particular, a brokered auction, in which a third-party auctioneer serves as an intermediary between customers and suppliers, can provide a way to allocate resources and set prices efficiently.

Several examples of electronic commerce and proposals for electronic commerce follow. Some of the examples involve auctions. In certain examples, the electronic "commerce" takes place in a simulated economy and is carried out with fictitious funds, the electronic equivalent of play money.

CommerceNet (Menlo Park, Calif.; http://www.commerce.net on the Internet's World Wide Web) is a consortium of companies that is working to promote electronic commerce on the Internet. According to an article in the Aug. 29, 1994 issue of Business Week, at page 14 ("Technology & You"), "CommerceNet hopes to make transactions work over the Internet so easily that a company in Palo Alto could put out a request for proposals in the morning, receive bids from all over the world by evening, and send out an electronic purchase order the next day."

Agorics, Inc. (Los Altos, Calif.) describes itself as "a company that develops and markets software for the support of distributed applications. Agoric software systems manage the resources of computing networks using the mechanisms of market processes—auctions, price feedback, and supply and demand—in other words, an idealization of real economic markets." Agorics, Inc. asserts that in cooperation with Sun Microsystems Laboratories (Mountain View, Calif.), it has completed a project in which a real-time auction in ATM (asynchronous transmission mode) network bandwidth is used to support coexistence of ordinary network traffic with the delivery of digital video.

An article co-authored by the inventor entitled "Spawn: A Distributed Computational Economy," which appeared in the *IEEE Transactions on Software Engineering,* vol. 18, no. 2 (February 1992) at pages 103–117, describes an open, market-based computational system that uses idle computational resources in a distributed network of heterogeneous computer workstations. At page 106, the Spawn system is described as being "organized as a market economy composed of interacting buyers and sellers. The commodities in this economy are computer processing resources; specifically, slices of CPU time on various types of computer workstations in a distributed computational environment." Thus the Spawn system pertains to a simulated or fictitious marketplace for access to computational resources.

U.S. Pat. No. 5,394,324, applied for by Clearwater and commonly assigned to the assignee of the present invention, is entitled "Auction-Based Control System for Energy Resource Management in a Building." According to the Abstract, the patent discloses "[a]n auction-based apparatus and method for supplying temperature conditioned air."

The document services industry has begun to enter the new electronic, networked world. For example, distributed document services such as distributed printing (as disclosed, for example, in U.S. Pat. No. 5,287,194, incorporated hereinabove by reference) have become available. Even so, the industry's traditional inefficient pricing practices persist, to the detriment of both customers and suppliers.

Secretive and arcane pricing practices are, unfortunately, all too common in the document services industry, especially among providers of "high-end" (e.g., high-volume or very high-quality) document services. For example, suppose a customer wishes to have a special report professionally printed and bound in quantity. The customer provides the particulars of the job to a print shop, meets one-on-one with the shop's manager or service representative, and is quoted a price for printing, binding, and delivering the finished documents. If time permits, the customer may obtain a second price quote from a competing print shop. However, the customer's choice of geographically proximate print shops is likely to be quite limited. Moreover, even where there is a choice, the print shops are not likely to advertise their prices openly, at least not for large jobs. In short, both the customer and the print shops have limited information. The result is an economically inefficient market, in which resource allocation and pricing are suboptimal. A better way to establish prices for document services is needed.

SUMMARY OF THE INVENTION

The present invention is directed to a system and method that enable and facilitate an electronically networked, highly automated, brokered auction in a domain where a brokered auction has heretofore not been considered worthwhile or even possible, namely, the document services industry. The present invention makes it possible, in the new world of electronic networks, for distributed document service providers to offer customers more than just a faster version of the old-style print shop with its secretive, inefficient pricing practices.

In one aspect, the invention provides a method in which a plurality of processes are executed, including a customer process representing a customer, a supplier process representing a supplier, and a broker process capable of serving as an intermediary between the customer and supplier processes. The broker process is provided with a description of a document service. Responsively to the description thus provided, an auction for the document service is conducted, as follows: A customer or supplier process submits a bid for the document service. The broker process receives bidding information including the submitted bid. The broker process attempts to establish a price for the document service responsively to the received bidding information and, if a price can be established, establishes the price. If a price is established, the broker process proposes a transaction wherein the document service is to be provided at the established price. If the proposed transaction is accepted, the transaction can proceed automatically. For example, the customer process can electronically transmit the contents of a document to the supplier process, which can then cause the document service to be automatically performed for the transmitted document.

The invention will be better understood with reference to the drawings and detailed description below. In the drawings, like reference numerals indicate like components.

DETAILED DESCRIPTION

The invention concerns the provision of document services by suppliers, such as professional print shops or publishers or in-house corporate or government document services departments, to customers, such as individuals, companies, or corporate or government departments. Document services can include, for example, printing, scanning, interpretation, text and image recognition, editing, reproduction, binding, colorization, transmission (e.g., by facsimile or by electronic mail), mailing, storage (e.g., in microphotographic or digital form), retrieval, format conversion, authentication, searching, and many others.

In a specific embodiment that will now be described, the invention contemplates a brokered auction in which, for example, a customer who needs a particular document services job done can provide a request for these services to a broker. Suppliers can bid competitively on the request by submitting bids to the broker, who auctions the job off to (for example) the lowest bidder.

The auction can, but need not, result in a transaction between a particular supplier and the customer for the job at an agreed-upon price. Preferably, the customer is afforded one or more fail-safe mechanisms by which to avoid entering into an unfavorable transaction if the auction results prove unsatisfactory. For example, the customer can be given an opportunity to confirm the terms of the deal before agreeing to enter the transaction. Thus, after the broker closes the bidding and informs the customer of the winning supplier and price, the customer can (and typically will) be given an opportunity to indicate to the broker whether an acceptable result has been reached, and if not, to decline or cancel the job altogether. In this way, the customer is not bound to pay a price that is unacceptably high or to work with a supplier that the customer prefers to avoid. Alternatively, instead of simply picking a winner, the broker can offer the customer a choice of several possible winners, based on (for example) the three or four lowest bids. The customer can then be given an opportunity to select from among these candidates, or to decline or cancel. Still further, the customer alternatively or additionally can specify a reservation or maximum price to the broker in advance, either before the start of the auction or during the auction, and the broker will screen out bids above this price. The broker will not propose to the customer a transaction in which the job is to be performed for a price above the reservation price.

In the specific embodiment, the auction is conducted through the medium of a computer network, such as a wide-area network. The customers, the suppliers, and the broker or brokers are represented by software processes that can communicate with one another across the network. Customers, suppliers, and brokers can be geographically distant from one another, and can themselves be geographically distributed entities. Nevertheless, interprocess communication is typically very rapid, even virtually instantaneous. Moreover, the computerized auction sequence can be largely or entirely automated, so that it can be conducted with minimal human intervention.

The invention can facilitate the growth of an open market for document services, a market whose business practices are very different from the secretive pricing practices of today. In this new market, customer requests can be placed rapidly and continuously, and many customer requests can be placed simultaneously. Suppliers can respond very quickly to the customer requests with competitive bids, and brokers can rapidly conduct computerized auctions to match customers with suppliers. It is possible for a final transaction to be ready for customer confirmation and subsequent execution within seconds, or even milliseconds, of a customer's initial request, even if the customer is in Chicago, the winning supplier in Los Angeles, and the broker a distributed entity somewhere in cyberspace.

A concrete example illustrates these ideas. Suppose a company in Des Moines, Iowa needs 100,000 copies of its annual report printed and mailed to its stockholders. According to the invention, the company's purchasing officer logs onto, for example, the Internet (assumed here to support data encryption and other protocols to ensure the security of financial transactions) and contacts a document services broker. The broker's physical geographic location is of no consequence to the company's purchasing officer; all the purchasing office needs to know is that the broker has a World Wide Web site or other suitable site on the Internet, and can accept the purchasing officer's request electronically at that site. The purchasing officer (more precisely, a software process that represents the purchasing officer or her company) places the printing and mailing request with the broker, providing particulars such as the number of copies to be printed, the size and paper quality of the report, the geographic distribution of the stockholders on the mailing list, the timetable for completion of the job, and any other particulars that will be needed for suppliers to estimate their costs for completing the job. With this information in hand, the broker (more precisely, a software process that represents the broker) accepts bids on the job from suppliers (more precisely, software processes that represent the suppliers). The broker can, for example, broadcast or multicast the job requirements to numerous suppliers who can then bid on it in a competitive auction. Once again, the geographic locations of the suppliers are unimportant so long as their Internet addresses are known. The broker can conduct one or more rounds of auctioning among the various suppliers who submit bids on the job.

At the close of the auction, perhaps a few milliseconds or a few seconds later, the broker has determined which supplier has won the auction and at what price. Suppose that the supplier has its central offices in Kansas City, with various printing facilities and branch offices worldwide. The broker communicates the name and Internet address of the winning supplier to the customer, along with the quoted price, and provides the customer with an opportunity to accept or decline the transaction. Assuming that the customer accepts, the transaction goes forward. The substance of the job (e.g., the contents of the report and the names in the stockholder mailing list) can be provided electronically to the supplier by the customer, either directly or through the broker, along with accounting information such as the customer's billing address or credit card or electronic funds transfer information and the payment terms. The supplier tracks this information at its Kansas City headquarters and performs the printing and mailing at several locations, for example, printing 85,000 copies at sites in San Antonio and Omaha for mailing to U.S. addresses and 15,000 copies at a site in Singapore for mailing to addresses in Asia. The report is printed immediately and mailed later that day. Meanwhile, the broker collects a fee from the customer, or the supplier, or both, for services rendered. The fee can be paid electronically or conventionally.

Network Hardware and Software

In the specific embodiment, the method of the invention is practiced in the environment of a computer network, such as a public network (e.g., the Internet), a value-added network, or a homogeneous or heterogeneous combination of such networks. As will be appreciated by those of skill in the art, the network includes both hardware and software and can be viewed as either, or both, according to which description is most helpful for a particular purpose. For example, the network can be described as a set of hardware nodes that can be interconnected by a communications facility, or alternatively, as the communications facility itself with or without the nodes. As another example, the network can be described as a set of software processes that can communicate information with one another via interprocess communication pathways using appropriate communications protocols, or alternatively, as the interprocess communication pathways themselves, with or without the processes and with or without the information being interchanged thereby. It will be further appreciated that the line between hardware and software is not always sharp. Moreover, it is often convenient to speak of "processes communicating over the network" and the like, it being understood by those of skill in the art that such communication involves both software and hardware aspects.

Figure 1:
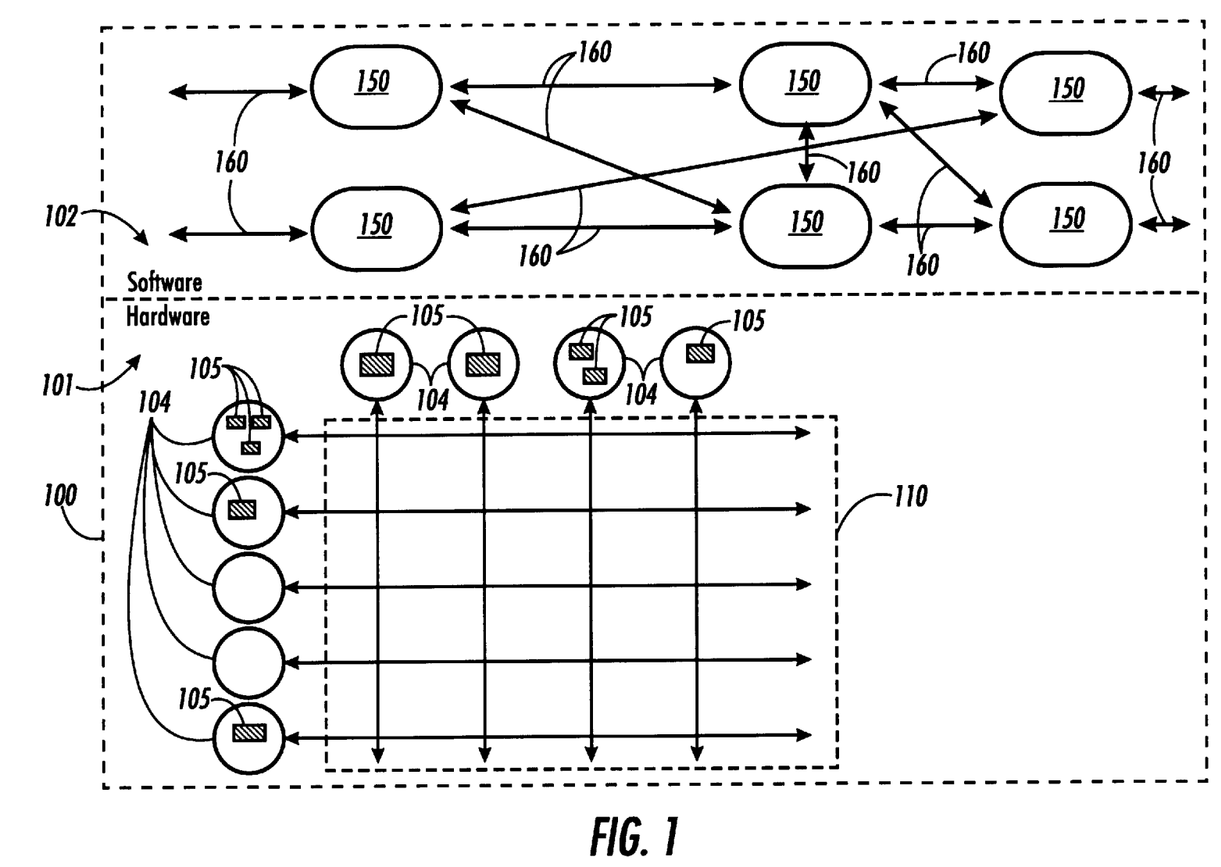
FIG. 1 illustrates computer networking hardware and software suitable for practicing the invention in a specific embodiment.

FIG. 1 illustrates a computer network 100 over which a document service auction can be conducted in the specific embodiment of the invention. Network 100 includes hardware 101 and software 102. Network 100 has hardware nodes 104 interconnected by a communications matrix 110. Each of nodes 104 can provide a point or locus of interface between network 100 and the outside world.

Network 100 can incorporate a collection of subnetworks. For example, two or more interconnected wide-area networks can form a larger network. As another example, a broker can solicit bids on two or more disparate networks, such as a public network and a value-added network, at once.

Nodes 104 can be computers, such as personal computers, workstations, servers, or mainframe computers. They can also be document processing devices, such as scanners, printers, facsimile (FAX) machines, or multifunction document machines, or more complex entities, such as local-area networks to which are connected a collection of computers and devices or personal computers connected via dial-up connections to remote servers. Further, the nodes can be entire installations, such as print shops, reprographics shops, or other document services shops. A local-area network, wide-area network, or collection of networks serving a particular customer, supplier, or broker can itself be treated as a node 104 of network 100. The nodes of the network can be heterogeneous; that is, one node need not (and typically will not) be the same as another.

Communications matrix 110 facilitates communications among and between nodes 104. Either wired or wireless communications, or both, can be supported. Communications matrix 110 can include, for example, a telephone system, a wireless digital communication system, or an asynchronous transmission mode (ATM) switching fabric. A given node 104 can be connected either continuously or intermittently with communications matrix 110. For example, a node 104 can be connected with communications matrix 110 via a dedicated hardware link or via a modem or dial-up connection. It will be appreciated that communications matrix 110 can be almost any digital communications infrastructure that provides adequate bandwidth and information security appropriate to the particular circumstances in which the invention is to be used. In practice, because the specific embodiment can (and typically will) be used to auction commercial document services that are to be paid for in real money rather than with "play money" or fictitious funds, communications matrix 110 preferably supports information security adequate to to facilitate commercial transactions and, in particular, to ensure that financial matters, such as bank account numbers, credit card numbers, and digital funds transfers, are handled in a trustworthy manner.

Network 100 supports a set of software processes 150 that can represent "real-world" customers, suppliers, and brokers of document services. The real-world customers, suppliers, and brokers represented by processes 150 can be, for example, individual human beings, businesses, corporations (or divisions or departments thereof), government agencies, or institutions. The real-world customer and suppliers can also be machines or other automated resources affiliated with consuming and producing document services. For example, a customer can be a personal computer or workstation that requires a document service to be performed, and supplier can be a printer, scanner, or other device for providing the required service.

Software processes 150 are executable by processors 105 incorporated into nodes 104. A given node 104 can have zero, one, or more processors 105. The processors 104 corresponding to a given node 105 either can be located at a single geographic site, as in a multiprocessor or parallel-processor computer or in a local-area network connecting several computing nodes, or can be distributed across multiple geographic sites.

The correspondence between processes 150 and processors 105, and thus between processes 150 and nodes 104, need not be one-to-one. In particular, multiple processes can be run by a single processor, and a single process can be run by multiple processors.

Although the term "process" is used here for the elements labeled 150 in FIG. 1, persons of skill in the art will appreciate that other software entities that perform work over time, such as threads, tasks, or intelligent agents, can be used in some embodiments. Also, though "process" is spoken of in the singular, it will be understood that multiple processes can be involved and can be carried out in sequence or contemporaneously with one another. For example, a broker can be represented in network 100 as a collection of many processes running at once. Each such process can be associated with a different auction, or multiple processes with a single auction, or a single process with multiple auctions.

Processes 150 can communicate with one another through interprocess communication pathways 160, which support such communication through communications protocols. For example, communications protocols such as TCP/IP, ATM, Ethernet, or proprietary protocols can be used, and different protocols can be used in different pathways 160 or along different portions of a given pathway 160. Pathways 160 can be continuous, as where a process 150 maintains constant contact with another process 150, or intermittent, as where a process 150 establishes contact with another process 150 at the beginning of an auction or transaction and ceases contact at the end of the auction or transaction.

Persons of skill in the art will appreciate a great range of possibilities for practicing the invention using different networking hardware and software configurations.

Parties to the Auction

In a traditional auction, a human broker can mediate between human customers and suppliers who can bid against one another for the rights, respectively, to buy or sell an item or property that is the subject of the auction. In an automated auction for a document service according to the invention, a process representing a broker can mediate between processes acting on behalf of customers and processes acting on behalf of suppliers, which processes can bid against one another for the rights, respectively, to buy or sell (that is, receive or provide in exchange for an agreed-upon price) a document service that is the subject of the auction.

In the specific embodiment, an auction for a document service can be conducted in which processes 150 serve to represent the various parties to the auction, namely, a customer or customers, a supplier or suppliers, and a broker. The broker process supervises the auction proceedings and, in particular, acts as the auctioneer, accepting bids from one or more other processes that participate in the auction by bidding for the document service. The document service being auctioned can be, for example, a service requested by a customer, a service offered by a supplier, or even a service specified by the broker who then seeks a customer and supplier. The processes that participate in the bidding can include, for example, supplier processes that bid against one another on behalf of their respective suppliers for a given customer's business, or customer processes that bid competitively on behalf of their respective customers for a given supplier's business, or a mixed pool of customer and supplier processes that bid on behalf of their respective customers and suppliers for rights to participate in a document services transaction previously specified by one of them or by the broker.

Figure 2:
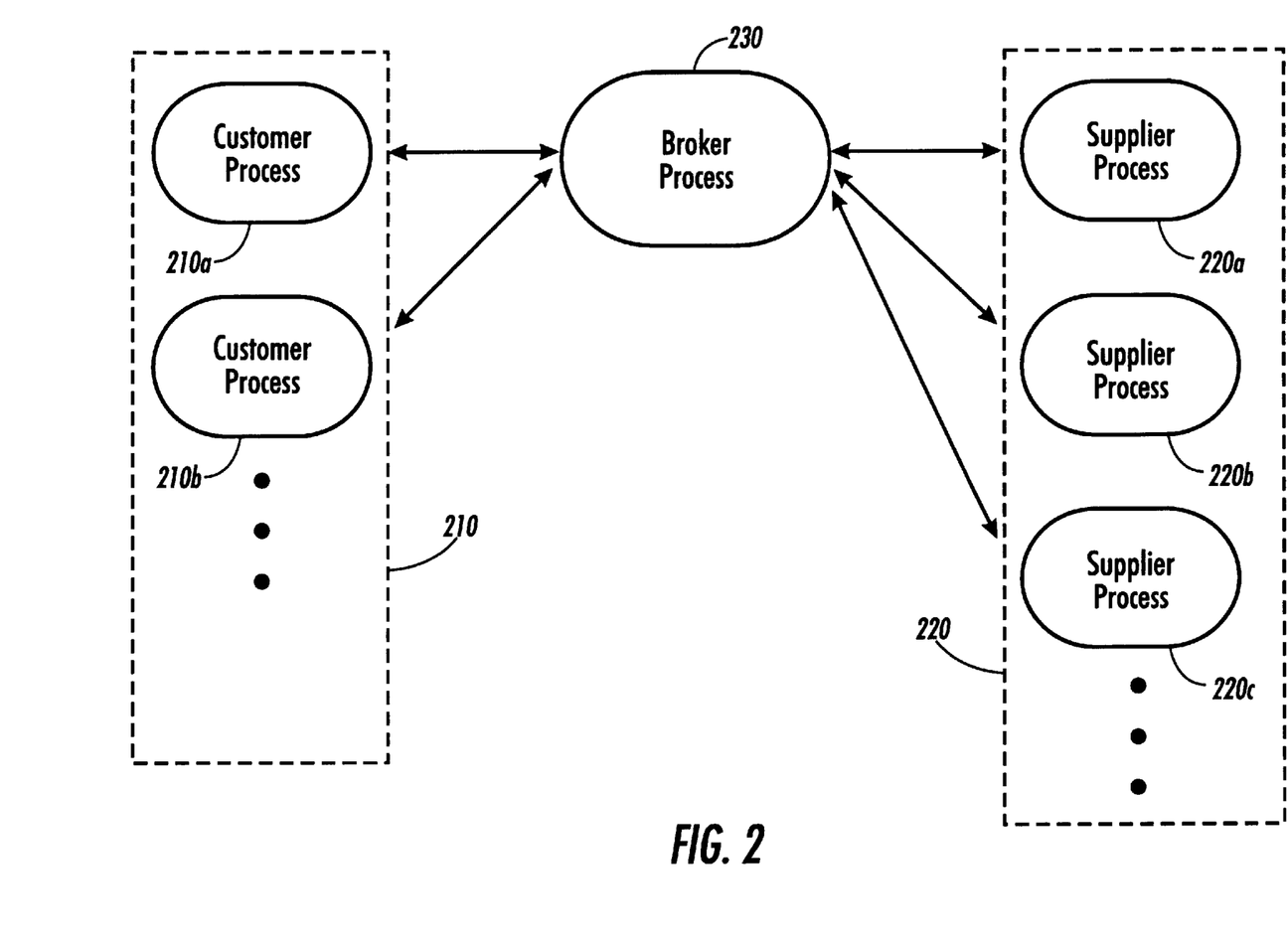
FIG. 2 schematically depicts the relationships among software processes representing customers, suppliers, and a broker in a document services auction.

FIG. 2 schematically depicts the relationships among software processes in a document service auction. A set of one or more customer processes 210, a set of one or more supplier processes 220, and a broker process 230 can be seen. FIG. 2 shows, in particular, exemplary customer processes 210*a* and 210*b* and exemplary supplier processes 220*a,* 220*b,* and 220*c*. Broker process 230 is a process that oversees the auction and acts as auctioneer, and that can facilitate transactions among and between customer processes 210 and supplier processes 220. In particular, broker process 230 can accept document services job requests from customer processes 210 and solicit and accept bids on such job requests from supplier processes 220, and can strike bargains between customer processes 210 and supplier processes 220.

All of the processes 210, 220, 230 are included among software processes 150, and accordingly can represent "real-world" entities including individuals, companies, departments, governments, and so forth. In particular, broker process 230 can, for example, act on behalf of a real-world individual, company, or agency that specializes in or provides brokering of document services, possibly along with other goods and services. Customer processes 210 and supplier processes 220 can act on behalf of real-world customers and suppliers, respectively.

Customer processes 210 and supplier processes 220 advantageously can incorporate, or be incorporated in, software for facilitating the fulfillment of document services transactions. Such software can include, for example, software for communicating with the other party to a transaction agreed upon at auction, software for controlling or effecting the actual performance of the document service, and, in the case of a commercial transaction for a commercial document service, software for automatically arranging for credit or funds transfer upon completion of the document service.

Although FIG. 2 depicts a single broker process 230, it will be appreciated that a document services marketplace can support a choice of brokers and that, in general, there can be more than one broker process 230 available to a given set of customer processes 210 and supplier processes 220. However, in this embodiment it is assumed that for any given auction, there is one and only one broker process 230.

In a traditional auction, a human broker acts as a neutral third party or clearinghouse with respect to human customers and suppliers. Analogously, in the specific embodiment, broker process 230 acts as a neutral third party or clearinghouse with respect to customer processes 210 and supplier processes 220. Preferably, broker process 230 does not represent any particular real-world customer or supplier whose respective process participates in an auction that broker process 230 oversees.

Ordinarily, the same real-world entity does not participate as both customer and supplier in a given auction. However, the same real-world entity can participate as supplier in one auction and as customer in a related auction or auctions. For example, suppose a print shop receives a contract to perform a document service for an end customer by being the winning supplier in a first auction. The print shop can then seek to subcontract part of this work to another print shop by bidding as a customer in a second auction in which potential subcontractors participate as suppliers. Accordingly, with respect to different but possibly related auctions, a single real-world entity can be represented both by a customer process 210 and by a supplier process 220, which, respectively, correspond to the entity's distinct roles as customer and supplier in the different auctions.

Processes 210, 220, 230 can include or be coupled to user interface software (not shown) to allow for varying degrees of human intervention and control in the auction proceedings. For example, if a human customer represented by customer process 210a needs or wants to purchase a particular document service, the human customer can instruct customer process 210a via a user interface to place a request for the document service with a broker. Customer process 210a can communicate the request to broker process 230, and the auction proceedings for the document service can then proceed more or less automatically, with little or no human intervention, until the auction is complete and the broker process 230 has determined a winning bid, for example from supplier process 220a, and has determined a price for the document service in accordance with a set of auction rules. Further, broker process 230 can automatically propose to customer process 210a a transaction, based on the winning bid, in which the real-world supplier represented by supplier process 220a is to provide the document service for the human customer represented by customer process 210a at the price determined by broker process 230 in the auction. At this point, customer process 210a can notify its human customer via the user interface as to the terms of the proposed transaction and give the human customer the final say as to whether to accept or decline the transaction.

Customers, suppliers, and brokers can be geographically remote from one another, and the processors that execute their respective processes 210, 220, 230 can likewise be remote from one another. Thus, for example, customer process 210a can execute on a personal computer or workstation at the real-world customer's site in one city, supplier process 220a on a computer or workstation at the real-world supplier's site in another city, and broker process 230 on a dedicated server in a third city. Alternatively, customer process 210a can execute on a personal computer or workstation at a company departmental customer's site located in one building of a large company, supplier process 220a on a computer or workstation at a company departmental supplier's site located down the hall or in another building of the company, and broker process 230 on a server located on another floor or in yet another building of the company, or even outside the company altogether. Still further, any or all of processes 210, 220, 230 can be executed by multiple processors that can be, for example, distributed across nodes 104 of network 100, so that a given process need not be associated with a single physical or geographic location. Thus, continuing with the previous example, customer process 210a (or supplier process 220a or broker process 230) can include some software that executes locally on a real-world customer's (or supplier's or broker's) personal computer, some software that executes on a server elsewhere in the same building or complex of buildings, some software that is sent across network 100 to be executed at a remote site, and so forth; persons skilled in the art will appreciate numerous possibilities in this regard.

An Auction Among Multiple Supplier Processes

Figure 3A:
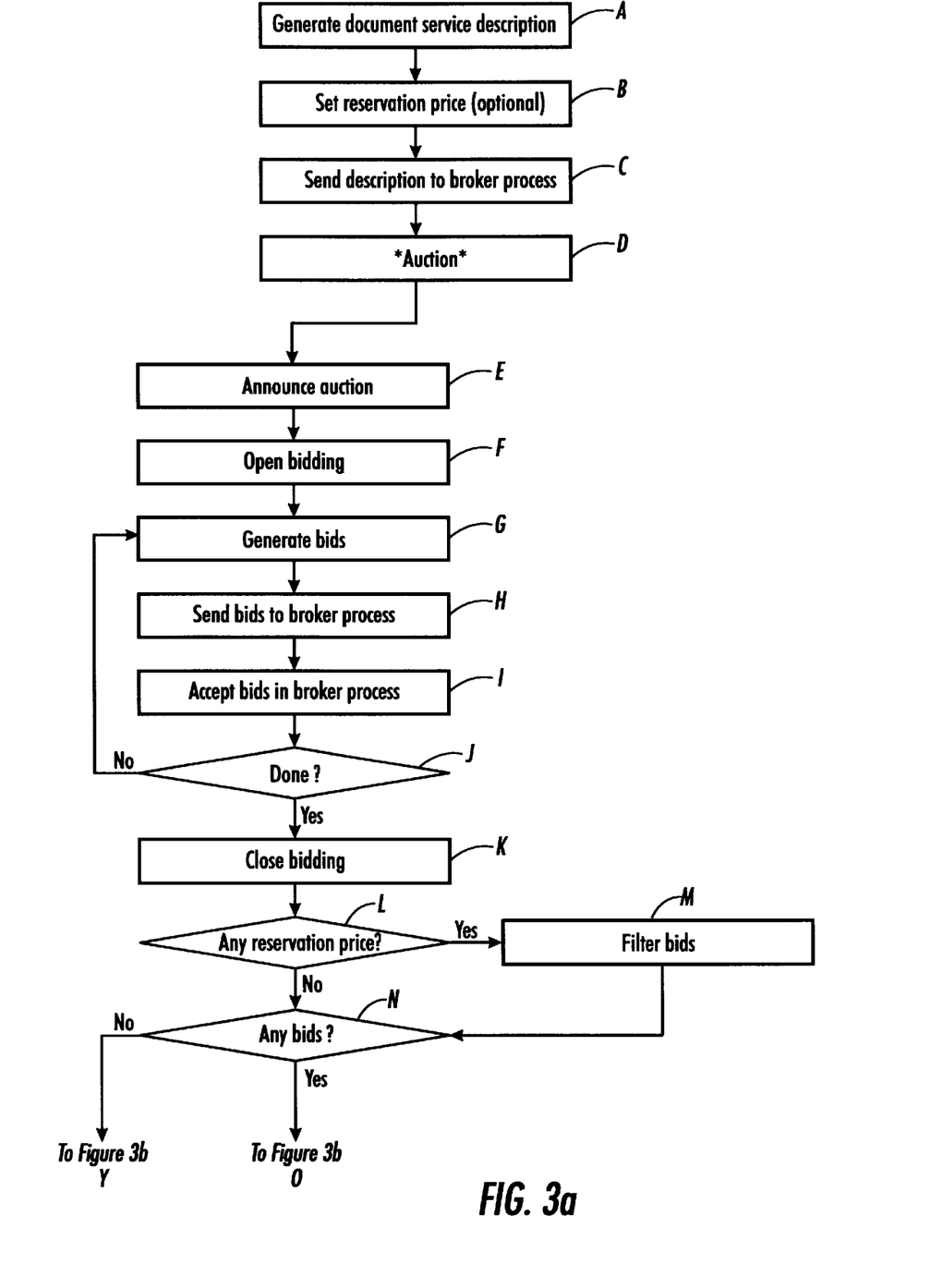
FIGS. 3a and 3b are a flowchart showing the steps of a single-customer-process, multiple-supplier-process (or a single-supplier-process, multiple-customer-process) auction sequence.
Figure 3B:
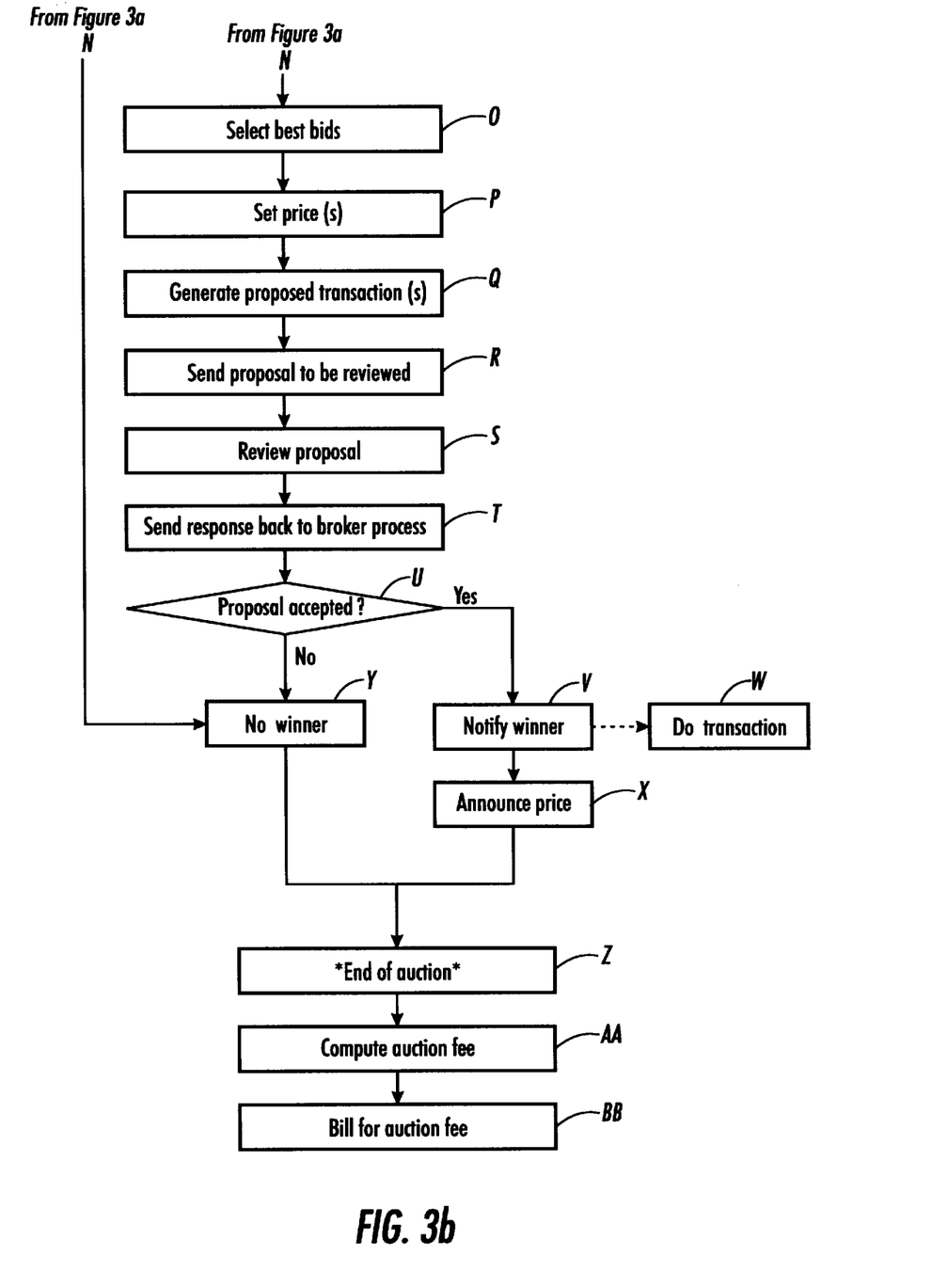

The flowchart of FIG. 3 illustrates the sequence of steps in an automated document services auction in the specific embodiment. It is assumed in FIG. 3 that a customer process 210 acts on behalf of a real-world customer who has a document services job to be done and who seeks a real-world supplier, represented by one of supplier processes 220, to do the job at an acceptable price. Different supplier processes 220, each acting on behalf of a real-world supplier, can compete for the job by bidding against each other in the auction. Broker process 230 oversees the auction and acts as auctioneer. More specifically, for concreteness of exposition, the customer process in FIG. 3 is taken to be customer process 210a, although it could be any of customer processes 210. Similarly, the supplier processes that submit the winning and potentially winning bids are taken to be among supplier processes 220a, 220b, 220c although they could be any of supplier processes 220.

In FIG. 3, customer process 210a generates a job request for a document service that is to be the subject of the auction (step A), specifying the particulars of the document service in appropriate detail. Customer process 210a can generate the request, for example, automatically in response to pre-programmed instructions or in response to events occurring in the marketplace, as well as in response to input received from the customer through a user interface. Optionally, customer process 210a can also specify a reservation price, that is, a maximum price that the customer authorizes to be paid at auction for the requested document service (step B). Alternatively, customer process 210a can specify a reservation price during the auction itself, or not at all. Customer process 210a communicates the document service job request along with any specified reservation price to broker process 230 via network 100 (step C).

Once broker process 230 receives the job request from customer process 210a, broker process 230 can hold an auction for the requested document service (step D). At the outset, broker process 230 informs supplier processes 220 acting on behalf of prospective suppliers that an auction will be held for the requested document service (step E). For example, broker process 230 can announce or broadcast the particulars of the job request via network 100. Then, either immediately thereafter or at a time scheduled by the announcement or broadcast, broker process 230 opens the bidding and begins to accept bids from supplier processes 220 (step F). Any or all of supplier processes 220 can participate in the bidding.

Persons skilled in the art will appreciate that auctions can be of different types, having different rules, practices, or methodologies according to which bids are accepted and evaluated. For example, in some types of auctions, information is available to bidders about each other's bids during the bidding, whereas in other types of auctions, each bidder knows only its own bid. As another example, the type of auction can affect the way in which price is determined upon close of auction. Thus, in a sealed-bid second-price auction, no bidder knows the value of any bid other than its own, and the final price is set according to the second-place bidder's bid rather than according to the winner's bid.

The type of auction used in the specific embodiment can be chosen according to the circumstances of the marketplace and the particular auction, taking into account considerations such as customer and supplier preferences and the nature and characteristics of the document service being auctioned. Any number of different types of auctions can be used. Some illustrative examples are sealed-bid second-price auctions, English auctions, and Dutch auctions. These and other types of auctions are well described in the literature on auctions and auction theory; see, for example, chapter 10 of *Game Theory* by Roger Myerson (Cambridge, Mass.: Harvard University Press, 1991). Whichever type of auction is used, the type of auction will be reflected in the software of broker process 230, which oversees the auction, and also possibly in the software of customer processes 210 and supplier processes 220, which participate in the auction.

During the bidding, each of the supplier processes 220 can generate a bid or, if the auction rules so allow, a series of bids (step G). Supplier processes 220 communicate their respective bids via network 100 to broker process 230 (step H), which automatically accepts these bids for consideration (step I). Preferably, supplier processes 220 bid automatically, without human intervention, so as to expedite the auction proceedings; for example, bids can be made in accordance with preauthorized instructions issued by real-world suppliers. Each bid indicates a willingness, on the part of a real-world supplier on whose behalf the bid is submitted, to provide the requested document service at a given price indicated in the bid. For example, if supplier process 220a acts on behalf of a supplier who is willing to provide the requested document service for $100, supplier process 220a can generate and send to broker process 230 a bid for $100. If the same supplier has authorized provision of the service for a lower price of $80 at a point later in the auction, and the auction rules permit a series of bids by a single bidder, supplier process 220a can at that point generate and send to broker process 230 another bid for $80.

Broker process 230 continues to accept bids until an ending criterion for the auction is met (step J). For example, the auction can end after a certain time interval has elapsed or when a certain maximum number of bids has been received, whichever comes first, or when no further bids are received for some elapsed time interval (analogous to "Going, going, gone!" as called by a human auctioneer in a traditional oral auction), or upon satisfaction of any other appropriate ending criterion or criteria. Thereafter, bidding closes (step K).

With all bids in, broker process 230 can determine which of the supplier processes 220, if any, has won or potentially won the auction. If customer process 210a has set a reservation price (step L), broker process 230 eliminates all bids at prices above the reservation price (step M). If there were no bids at or below the reservation price (or, if no reservation price was set, if there were no bids at all submitted during the auction), (step N), broker process 230 declares that there is no winning supplier (step Y) and the auction ends (step Z) without any striking of a bargain.

If there was at least one bid at or below the reservation price, or if no reservation price was specified, broker process 230 selects a winning bid or a set of one or more potential winning bids (step O). Broker process 230 makes this selection automatically based on one or more criteria that define what makes a winning bid. Typically, the winning bid is the bid indicating the lowest price, because the customer would generally prefer to pay the lowest possible price for the requested document service. In some auctions, however, criteria other than or in addition to low price can be used as a basis for selecting a winning bid. Moreover, the final selection of the winner can be left to customer process 210a, which automatically or with human input selects one from a set of potential winning bids provided by broker process 230, as will be discussed momentarily.

For example (in step O), suppose that broker process 230 is using low price as its selection criterion and that supplier processes 220a, 220b, and 220c have submitted, respectively, the lowest, second-lowest, and third-lowest priced bids. If a single winning bid is to be selected directly by broker process 230 without any participation by customer process 210a in this selection, then the winning bid is the lowest-price bid. Accordingly, broker process 230 automatically selects as the winner the supplier process 220 that has submitted the bid with the lowest price, which is supplier process 220a. Alternatively, if the customer is to be provided with a choice of suppliers, then broker process 230 deems to be the potential winners several of the lowest bids, such as the three or four lowest bids or all bids within a certain price range of the lowest bid. If, for instance, the three lowest bids are used, broker process 230 selects as potential winners the supplier processes 220 that have submitted the bids with the three lowest prices, which are supplier processes 220a, 220b, and 220c, respectively. If fewer than three bids were submitted, or fewer than three bids remain after the reservation price has been taken into account, broker process 230 selects all remaining bids as potential winners. Thus if the lowest bid submitted by supplier process 220c exceeds a reservation price set by customer process 210a, only the bids by supplier processes 220a and 220b will be selected as potentially winning bids.

Having selected a winning bid or potential winning bid or bids, broker process 230 automatically determines a price or prices associated with these bid or bids in accordance with the type of auction held (step P) and automatically generates, for consideration by the customer, a proposed transaction or a selection of proposed transactions incorporating these prices (step Q). Typically, the prices are the same as the bid prices, and the proposed transactions are ones in which a supplier will provide the customer with the requested document service for the supplier's bid price. Thus, for example, if supplier processes 220a and 220b respectively bid $75 and $80, and these bids are selected as potential winners, broker process 230 typically will propose a selection of a transaction between the customer represented by customer process 210a and the supplier represented by supplier process 220a, in which the supplier provides the document service for $75, and a transaction between the customer represented by customer process 210a and the supplier represented by supplier process 220b, in which the supplier provides the document service for $80. However, the proposed transaction prices can be determined in other ways. In particular, for certain types of auctions, such as sealed-bid second-price auctions, a proposed transaction between the customer and a winning supplier (as determined by lowest bid price or other criteria) can specify a price different from what the winning supplier actually bid. For example, if (in step O) broker process 230 selects a single winning bid made by supplier process 220a in a sealed-bid second-price auction, the proposed transaction (produced in steps P and Q) will be one in which the supplier represented by supplier process 220a will provide the customer represented by customer process 210a with the requested document service for the second-lowest bid price, that is, the price of the bid that was made by supplier process 220b.

Broker process 230 communicates the proposed transaction or transactions to customer process 210a via network 100 (step R), giving customer process 210a a chance to evaluate the proposed transaction or transactions (step S). The evaluation can be entirely automated, but typically (especially for large or high-priced jobs) will involve confirmation by a human being, either the customer or the customer's human agent, through a user interface to customer process 210a. This gives the customer a chance to accept or decline any proposed transaction and further, if broker process 230 has offered a selection of proposed transactions for consideration, to select among the proposed transactions. In particular, the customer can evaluate whether a proposed price reflects what the customer really wants to pay a particular supplier for the job. For example, if (in step B) no reservation price was set, or if the reservation price set previously was in fact higher than the customer's true reservation price, the customer can decline the proposed transaction if the price is excessive or can select a lower-priced transaction if a selection of proposed transactions is offered. This allows the customer to avoid paying more than its true reservation price without having to reveal what that true reservation price is. As another example, if the customer favors a particular supplier for reasons other than price, such as the supplier's reputation, past experience with that supplier or other suppliers, or the like, the customer can decline proposed transactions with other suppliers or, if a selection of proposed transactions is offered, can choose the favored supplier over other suppliers who submitted lower bids. In short, the customer is afforded an extra measure of protection and need not commit to a perceived bad bargain.

Customer process 210*a* communicates the customer's response to broker process 230 via network 100 (step T). If no proposed transaction is accepted (step U), broker process 230 declares that there is no winning supplier (step V) and the auction ends (step Z) without any striking of a bargain.

If a proposed transaction is accepted (in step U), broker process 230 automatically notifies the winning supplier process 220 (e.g., supplier process 220*a*) via network 100 (step V). Thereafter, the transaction can proceed (step W). The acceptance by the customer of the proposed transaction at the close of the auction indicates that the customer has reached agreement with the winning supplier on the terms of a contract in which the supplier will perform the requested document service for the transaction price. If the supplier and customer have agreed to be bound by the results of the auction, then they have a binding contract; otherwise, they can finalize a contract as between themselves according to or based upon the terms agreed upon at auction. Once a contract is established, customer process 210*a* and supplier process 220*a* can execute the transaction automatically if these processes incorporate (or are incorporated in, or can otherwise access) appropriate software for fulfilling the transaction. For example, assuming that the transaction is for a printing job that is to be performed immediately, customer process 210*a* can electronically transmit a shipping address and the contents of the document or documents to be printed to supplier process 220*a* via network 100. Supplier process 220*a* can then automatically run software to cause the document to be printed and delivered to the real-world customer.

Contemporaneously with or shortly after notifying the winning supplier process (in step V), broker process 230 preferably announces, broadcasts, multicasts, or otherwise publicizes via network 100 the price agreed upon in the accepted transaction (step X). For example, if network 100 provides connectivity to the Internet, broker process 230 can automatically post current price information on a World Wide Web site or other suitable Internet site. This concludes the auction (step Z).

By publicizing the agreed-upon price at the end of the auction, broker process 230 signals the losing supplier processes 220 that they have lost. Broker process 230 can, in addition, directly notify each of them to this effect via network 100.

Moreover, by timely publicizing the agreed-upon price, broker process 230 provides auction participants and nonparticipants alike with current information about market conditions and, in particular, information about the price most recently paid for the document service that was auctioned. It is advantageous that current price information be made publicly and widely available via network 100. Accurate and timely knowledge of price information can provide an incentive for prospective participants to enter the market. By contrast, if the price is kept secret, or is made available only on a limited basis, nonparticipants are more likely to remain nonparticipants, and the operation of market forces thus can be impeded. In the same regard, it can be advantageous for broker process 230 to publicize (in step X) additional information about market conditions, such as prices recently paid for similar jobs, along with the agreed-upon price.

Prices and related information can be broadcast for different kinds of document services jobs that are agreed upon as standard in the industry or marketplace. Prices can be expressed, for example, as a price per page for a specified quantity of pages printed, reproduced, scanned, etc. As an example, the price per page can be the price for laser printing a page of black-and-white text; more precisely, it can be, for example, the price of printing an 8½"×11" page of black-and-white text at 600 dots per inch (dpi) onto 25-percent rag paper, in a minimum quantity of 1000 printed pages, with the text to be sent over the network by the customer in one of several industry-standard formats, and delivery of the printed output to be at the customer's place of business within the continental United States by 10:30 a.m. the next business day. As another example, prices and related information could be publicized for other jobs such as, for example, scanning and character-recognizing an A4 page of highlight-color text at 300 dpi resolution onto CD-ROM in minimum of 1000-page quantities with delivery in 6 hours, or dye-sublimation printing of a photographic image on acid-free large-format glossy paper in four-color CMYK format at 1200 dpi in minimum of 1-page quantities with delivery in 2 days and a 10-day money-back guarantee. These examples are merely suggestive, and many other possibilities for document services jobs that can be agreed upon as standard, as well as suitable descriptions thereof, will be apparent to persons skilled in the art.

After the auction, the broker typically collects an auction or brokerage fee for its services. Broker process 230 can automatically compute a fee, such as a commission or a fixed fee (step AA), and automatically invoice this fee via network 100 to the process or processes representing the party or parties who are to pay the fee (step BB). The process or processes can pay the fee automatically, without human intervention. For example, the customer can be charged a percentage commission based on the price of the accepted transaction, if any; in this case, broker process 230 can electronically bill customer process 210*a,* which can automatically arrange for payment via electronic funds transfer or the like. More generally, fees can be invoiced to and collected from the customer, the winning supplier, or all auction participants, or on whatever basis is appropriate to the business practices of the marketplace.

An Auction Among Customer Processes

Earlier, it was described how a customer process can specify a reservation or maximum allowable price to broker process. This reservation price can be thought of as representing the customer's bid for the job. Accordingly, multiple customer processes can bid against each other in an automated document services auction of the invention by asserting their respective reservation prices as bids. This can be advantageous, for example, when the job being auctioned is a standard job that can be useful to many different customers.

Thus in the specific embodiment it will be appreciated that FIG. 3, which has been explained with reference to a single-customer-process auction, also illustrates the steps of a single-supplier-process auction, in which the roles of customer and supplier are reversed from what was described above. Briefly, in such an auction, a single supplier process, such as supplier process 220*a,* generates (step A) and places with broker process 230 (step C) an offer to provide a specified document service. Supplier process 220*a* can also specify a reservation price, which in this case is a minimum price below which the supplier will refuse to do the job (step B). Broker process 230 holds an auction (step D) much as described above, except that here, customer processes 210 bid against one another (steps E, F, G, H); bids below the reservation price, if any, are eliminated (steps M,N); the winning bids are the bids for the highest prices, rather than the lowest prices (step O); and broker process 230 proposes a transaction or transactions to supplier process 220a (step Q), which can evaluate this proposal (step R) and respond accordingly (step S). If a transaction is accepted by supplier process 220a, the winning customer process, such as customer process 210a, is notified (step V). Losing customer processes are signaled of their losses when broker process 230 publicizes the price (step X), and can also be directly notified by broker process 230 via network 100.

An Auction Among Both Customer and Supplier Processes (Double Auction)

A traditional auction can involve bidding on the part of both customers and suppliers. That is, prospective suppliers can bid competitively against each other and prospective customers can bid competitively against each other, all within the context of the same auction. Moreover, the item or service that is being auctioned can be requested initially by one of the customers, or offered by one or more suppliers, or even be proposed in the first instance by the broker.

In a traditional multiple-customer, multiple-supplier auction (sometimes called a double auction), the broker accepts buy bids and sell bids for the item or service being auctioned. A buy bid means that an auction participant (typically, a customer) is willing to purchase the item or service for a price less than or equal to the specified price. A sell bid means that an auction participant (typically, a supplier) is willing to provide the item or service for a price less than or equal to the specified price. A transaction can proceed after the close of auction (that is, some supplier can perform the job for some customer at an agreed-upon price) if two conditions obtain: First, no supplier provides the item or service for less than that supplier has bid, and second, no customer pays more for the item or service than that customer has bid. Cases can arise in which no supplier offers a price acceptable to any customer. In such cases, the auction fails to establish a price and no transaction takes place.

An automated document service auction according to the invention can include simultaneous competitive bidding by multiple customer processes and multiple supplier processes. In the specific embodiment, broker process 230 can accept buy bids from customer processes 210 for the right to purchase the document service being auctioned and, at the same time, accept sell bids from supplier processes 220 for the right to provide the document service being auctioned. Each buy bid represents the maximum price that some real-world customer authorizes to be paid for the document service being auctioned. Each sell bid represents the minimum price for which some real-world supplier authorizes provision of the document service being auctioned.

At the close of auction, broker process 230 attempts to determine a winning customer process 210 and one or more winning or potentially winning supplier processes 220, and to set a price for the document service according to criteria appropriate for the type of auction conducted. For example, broker process 230 can select as the winning customer process the customer process 210 (e.g., customer process 210a) that made the highest buy bid, and can select as the winning supplier process the supplier process 220 that made the lowest bid (e.g., supplier process 220a). As another example, broker process 230 can select as the winning customer process the customer process 210 (e.g., customer process 210a) that made the highest buy bid, and can provide the winning customer process 210a with a range of potential winning supplier processes 220 (e.g., supplier processes 220a, 220b, 220c) from which to select in a manner similar to that described above for the single-customer-process auction. In any event, the auction has at most one winning customer process 210, and at most one winning supplier process 220, possibly chosen from among several potential winners. The price established at auction is the price offered by the winning supplier process 220 or, if the auction rules prescribe another price, the price assigned by broker process 230 to the winning supplier process 220. There can also be no winning supplier, as when a winning customer process 210 declines to accept any of the transactions proposed by broker process 230, or no winners at all, as when the highest bid by any customer process 210 is less than the lowest bid by any supplier process 220.

Figure 4A:
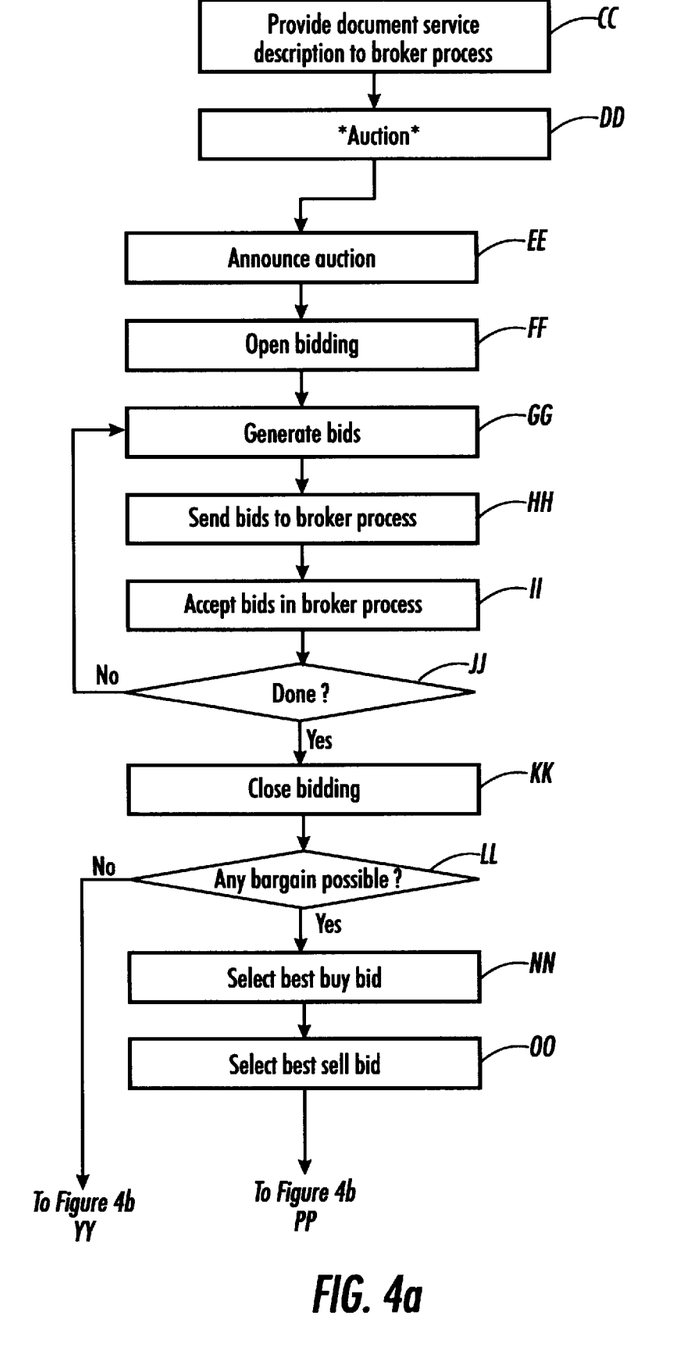
FIGS. 4a and 4b are a flowchart showing the steps of a multiple-customer-process, multiple-supplier-process auction sequence.
Figure 4B:
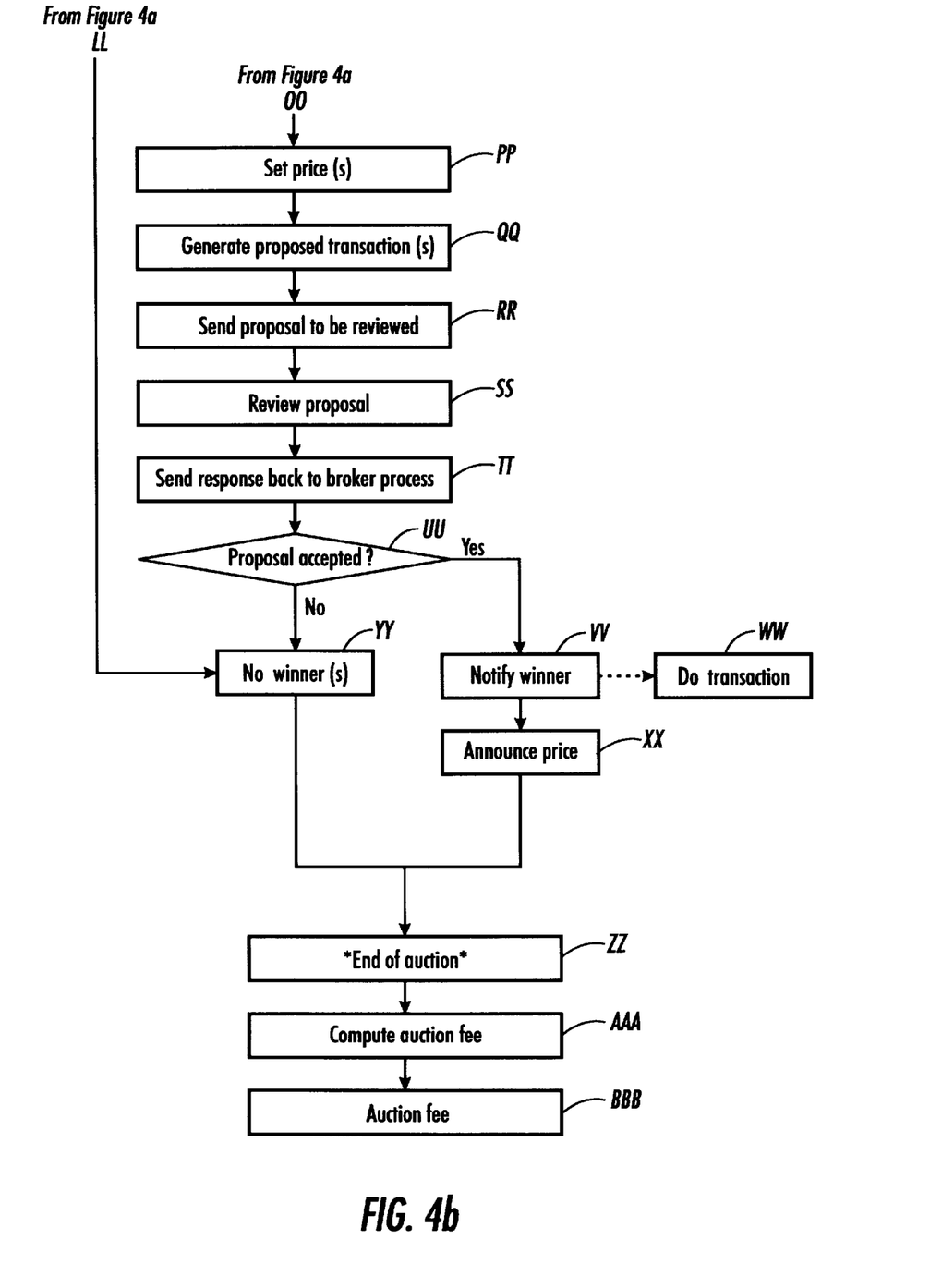

The flowchart of FIG. 4 illustrates the steps of a multiple-customer-process, multiple-supplier-process auction in the specific embodiment. Broker process 230 is provided with a document service job description (step CC). The job description, which includes a specification of the particulars of the job, can be generated and communicated to broker process 230 by another process, such as any of customer processes 210 or supplier processes 220, or can be generated by broker process 230 itself. Optionally, if the job description is submitted by a customer process 210 or a supplier process 220, it can be accompanied by an opening bid (respectively, a buy bid or a sell bid). This is analogous to specifying a reservation price in the single-customer-process or single-supplier-process auctions.

Once broker process 230 has the job description, it can hold the auction (step DD). At the outset, broker process 230 informs prospective auction participants represented by customer processes 210 and supplier processes 220 that an auction will be held for the document service (step EE). For example, broker process 230 can announce or broadcast the particulars of the job request via network 100. Then, either immediately thereafter or at a time scheduled by the announcement or broadcast, broker process 230 opens the bidding and begins to accept bids (step FF). Any or all of customer processes 210 and supplier processes 220 can participate in the bidding.

As for the single-customer-process and single-supplier-process auctions, the type of auction used in the specific embodiment for a multiple-customer-process, multiple-supplier-process auction can be chosen according to the circumstances of the marketplace and the particular auction. Some illustrative examples are sealed-bid second-price auctions, double-blind auctions, English auctions, and Dutch auctions.

During the bidding, each of the customer processes 210 and supplier processes 220 can generate a bid or bids (step GG) and communicate its respective bids via network 100 to broker process 230 (step HH), which accepts these bids for consideration (step 11). Customer processes 210 make buy bids for the document service and supplier processes 220 make sell bids for the document service. Broker process 230 continues to accept bids until an ending criterion for the auction is met (step JJ), at which point the bidding closes (step KK). Preferably, customer processes 210 and supplier processes 220 can generate and submit bids automatically, without human intervention, so as to expedite the auction proceedings. For example, a mobile customer process 210 (e.g., an intelligent agent) can be instructed to roam network 100 in search of good deals on auctioned document services that the customer needs, and accordingly to make bids on behalf of the customer up to a preauthorized spending limit.

With all bids in, broker process 230 can determine which of the customer processes 210 and supplier processes 220, if any, have won or potentially won the auction. Broker process 230 checks to see whether there is at least one buy bid at a price greater than or equal to the price of at least one sell bid (step LL). Broker process 230 can do this, for example, by comparing the prices of the highest-price buy bid and the lowest-price sell bid. If the highest-price buy bid names a price less than that of the lowest-price sell bid, then the conditions for a bargain cannot be met, because no customer has authorized payment of the price named by any supplier. In this event, broker process 230 declares that there are no winners (step YY) and the auction ends (step ZZ) without any striking of a bargain.

If there is at least one buy bid at a price greater than or equal to the price of at least one sell bid, broker process 230 selects a winning buy bid, corresponding to a winning customer process 210, such as customer process 210*a* (step NN), and also selects a winning sell bid or a set of one or more potential winning sell bids, corresponding to a winning supplier process or set of potential winning supplier processes 220 (step OO). Broker process 230 makes these selections automatically based on one or more criteria that define what makes a winning bid. Typically, the winning buy bid is the bid indicating the highest price that any customer has authorized to be paid for the document service being auctioned, and the winning sell bid is the bid indicating the lowest price at which any supplier has authorized provision of the document service being auctioned. In some auctions, however, criteria other than or in addition to price can be used as a basis for selecting winning bids. Moreover, the final selection of the winning sell bid can be left to the winning customer process 210*a*, which selects one from a set of potential winning sell bids provided by broker process 230, in a manner similar to the manner in which a winning customer process can select from among potential winning supplier processes in the single-customer-process auction.

Having selected a winning bid or potential winning bid or bids, broker process 230 automatically determines a price or prices associated with these bid or bids in accordance with the type of auction held (step PP) and automatically generates a proposed transaction or a selection of proposed transactions incorporating these prices (step QQ). Typically, the prices are the same as the bid prices, and the proposed transactions are ones in which a supplier will provide the winning customer with the requested document service for the supplier's (or, possibly, the customer's) bid price. However, the proposed transaction prices can be determined in other ways, as in a sealed-bid second-price auction.

Broker process 230 automatically communicates the proposed transaction or transactions to winning customer process 210*a* via network 100 (step RR), thereby notifying the winning customer process 210*a* that it has won and giving winning customer process 210*a* a chance to evaluate the proposed transaction or transactions (step SS). The evaluation can be entirely automated, but typically will involve confirmation by a human being through a user interface to winning customer process 210*a*. This gives the customer a chance to accept or decline any proposed transaction and further, if broker process 230 has offered a selection of proposed transactions for consideration, to select among the proposed transactions, thus affording the winning customer extra protection against a perceived bad bargain.

Winning customer process 210*a* communicates the winning customer's response to broker process 230 via network 100 (step TT). If no proposed transaction is accepted (step UU), broker process 230 declares that there is no winning supplier (step YY) and the auction ends (step ZZ) without any striking of a bargain.

If a proposed transaction is accepted (in step UU), broker process 230 automatically notifies the winning supplier process 220 (e.g., supplier process 220*a*) via network 100 (step VV). Thereafter, the transaction can proceed (step WW). For example, if the auction results establish a binding contract to be performed immediately, winning customer process 210*a* can automatically transmit a document or documents to winning supplier process 220*a*, which can automatically perform the document service or initiate or supervise its performance.

Contemporaneously with or shortly after notifying the winning supplier process (in step VV), broker process 230 preferably publicizes via network 100 the price agreed upon in the accepted transaction (step XX). This concludes the auction (step ZZ). Thereafter, broker process 230 can compute a fee for services rendered (step AAA), and bill this fee electronically via network 100 (step BBB).

Multiple Auctions

Thus far, individual automated document services auctions and transactions have been described. Typically, however, a marketplace involves an ongoing series or stream of auctions and transactions. For example, many customer processes 210 are likely to request different document services jobs at the same time. Accordingly, there can be many auctions at once and many auctions in rapid succession, and different auctions that overlap in time.

In the specific embodiment, depending on the communications bandwidth supported by network 100 and the processing power available to support broker process 230, broker process 230 can be configured to conduct multiple auctions for multiple jobs contemporaneously. Likewise, a given customer process 210 or supplier process 220 can be configured to be able to participate in multiple auctions contemporaneously. Each auction is for a separate job, that is, for a separately specified document service, and has at most one winning customer process 210 and at most one winning supplier process 220. Each auction is separately carried out according to the steps described above with reference to FIG. 3 or FIG. 4 as appropriate. In determining the results of any given auction, broker process 230 need not take into account the proceedings or results of any other auction.

A given real-world entity (individual, business, corporation, etc.) can be a customer in a first auction and a supplier in a second, related auction. This can be advantageous, for example, when a real-world document services provider is to serve as an principal contractor who subcontracts portions of a principal job to other suppliers. The document services provider acts as a supplier with respect to the ultimate consumer, but as a customer with respect to its various subcontractors. It can sell a document service to an end consumer in a first auction, and buy the service or a portion or portions thereof in a second auction (or in a series of additional auctions). The document services provider is represented by a supplier process 220 in the first auction, in which it acts as a supplier, and by a customer process 210 in the second auction, in which it acts as a customer. Preferably, a given real-world entity does not act as both customer and supplier in the same auction.

The invention makes it possible, for the first time, for a marketplace to arise in which document services jobs can be traded in a manner analogous to that in which other commodities, such as foodstuffs, are now traded. For example, in the specific embodiment the document service description that is provided to broker process 230 and bid upon at auction by customer processes 210 an d supplier processes 220 can specify a delivery date some time in the future, or can describe an option to buy or sell a given document service for a specified exercise or strike price. Thus the invention facilitates automated trading both in document services and in related instruments, such as document services futures, options, and so forth.

Conclusion

The present invention provides a computerized brokered auction mechanism for delivering document services over a network. The mechanism can respond rapidly to customer demands and can lead to better, more efficient utilization of document services resources and to a greater availability of more fairly priced document services.

The foregoing specific embodiment illustrates just some of the possibilities for practicing the present invention. Many other embodiments are possible within the spirit of the invention. For example, the invention can be used internally by a document services company to allocate resources efficiently. In particular, a printing company that has printing facilities at a number of locations or sites can hold an auction according to the method of the invention in which the various printing facilities can compete to process a given job. The auction, in this case, can be conducted on the basis of price, or on the basis of time to delivery or some other variable in lieu of price. As another example, in some embodiments of the invention, alternative hardware technologies, such as optical (photonic) or hybrid electro-optical technologies, can be used instead of or in addition to electronic technology to implement any or all of the computing, networking, and document services components and subsystems in the system and method of the invention. Accordingly, the scope of the invention is not limited to the foregoing specification, but instead is given by the appended claims together with their full range of equivalents.

What is claimed is:

1. In a system comprising at least one processor, a method for providing access to a document service over a computer network, said method comprising the steps of:

executing in the system a plurality of processes including
a first participant process, the first participant process being a customer process representing a customer,
a second participant process, the second participant process being a supplier process representing a supplier, and
a broker process capable of serving as an intermediary between the customer and supplier processes;
providing to the broker process a description of a commercial document service; and
responsively to the description thus provided, conducting an auction for the document service, the auction including the steps of
submitting a bid for the document service from a participant process,
receiving bidding information in the broker process, the received bidding information including the submitted bid,
attempting with the broker process to automatically establish a price determined by the broker process for the document service responsively to the received bidding information,
establishing said price for the document service with the broker process if said price can be established for the document service upon completion of the attempting step, and
if said price is established for the document service, proposing with the broker process a transaction wherein the document service is to be provided at the established price;
if said proposed transaction is accepted, said supplier initiating the performance of said document service over said computer network.

2. The method of claim 1 wherein the step of providing the description of the document service comprises:
generating in the customer process a request to be provided the document service; and
communicating the request to the broker process.

3. The method of claim 1 wherein the step of providing the description of the document service comprises:
generating in the supplier process an offer to provide the document service; and
communicating the offer to the broker process.

4. The method of claim 1 wherein the step of providing the description of the document service comprises generating in the broker process a specification for the document service.

5. The method of claim 1 wherein the step of submitting the bid for the document service comprises:
generating in the customer process a bid to be provided the document service; and
communicating the generated bid to the broker process.

6. The method of claim 1 wherein the step of submitting the bid for the document service comprises:
generating in the supplier process a bid to provide the document service; and
communicating the generated bid to the broker process.

7. The method of claim 1 and further comprising the steps of:
providing an auction safeguard from a participant process to the broker process; and
evaluating the auction safeguard in the broker process.

8. The method of claim 7 wherein the step of providing the auction safeguard comprises:
specifying a price limitation in a participant process; and
communicating the specified price limitation to the broker process.

9. The method of claim 7 wherein the step of providing the auction safeguard comprises:
providing a participant process with an opportunity to determine whether to accept the transaction proposed with the broker process; and
communicating to the broker process whether the transaction is accepted.

10. The method of claim 7 wherein:
the step of establishing a price comprises establishing a set of prices;
the step of proposing a transaction comprises proposing a set of transactions with the broker process, each transaction in said set being a transaction wherein the document service is to be provided at a price belonging to the established set of prices; and
the step of providing the auction safeguard comprises providing a participant process with the ability to select from among the set of transactions, and communicating to the broker process a preference with regard to a particular transaction of the set.

11. The method of claim 1 and further comprising the step of:
determining with a process of the plurality a fee for the auction.

12. The method of claim 1 and further comprising the steps of:
determining a fee using the broker process;

invoicing from the broker process the fee thus determined.

13. The method of claim 1 wherein:

the step of executing the plurality of processes further includes executing in the system a third participant process representing an auction participant in addition to the customer and the supplier;

the step of conducting the auction further includes submitting from the third participant process an additional bid for the document service; and the step of receiving bidding information includes receiving in the broker process the additional bid.

14. In a system comprising at least one processor, a method for providing access to a document service over a computer network, said method comprising the steps of:

executing in the system a plurality of processes including a first collection of participant processes, the processes of the first collection being customer processes, each customer process representing a customer, a second collection of participant processes, the processes of the second collection being supplier processes, each supplier process representing a supplier, and a broker process capable of serving as an intermediary among the customer and supplier processes;

providing a description of a commercial document service to the broker process;

responsively to the description thus provided, conducting an auction for the document service, the auction including the steps of submitting a set of bids for the document service, each bid of the set being submitted from a participant process, receiving the bids of the set in the broker process, determining in the broker process automatically and responsively to the received bids whether the bids can be reconciled to establish a price, and if the bids can be reconciled, establishing said price for the document service with the broker process; and said supplier bidding said established price initiating the performance of said document service over said computer network.

15. The method of claim 14 wherein the step of submitting the set of bids for the document service includes:

generating a buy bid in a customer process, the buy bid being a bid of the set, the buy bid indicating a price to be paid by a customer in exchange for receiving the document service.

16. The method of claim 14 wherein the step of submitting the set of bids for the document service includes:

generating a sell bid in a supplier process, the sell bid being a bid of the set, the sell bid indicating a price to be received by a supplier in exchange for providing the document service.

17. The method of claim 14 wherein the step of establishing the price includes:

selecting a preferred bid from among the bids of the set; and setting the price equal to a price indicated by the preferred bid.

18. The method of claim 14 and further comprising the step, performed if the bids can be reconciled, of:

providing access with the broker process to an indication of the established price, the indication being accessible to the customer and supplier processes.

19. The method of claim 18 wherein the step of providing access to an indication of the established price comprises publicizing the established price with the broker process.

20. In a system comprising at least one processor, a method for providing access to a document service over a computer network, said method comprising the steps of:

executing in the system a plurality of processes including a first participant process, the first participant process being a customer process representing a customer, a second participant process, the second participant process being a supplier process representing a supplier, and a broker process capable of serving as an intermediary between the customer and supplier processes;

providing to the broker process a description of a document service; and responsively to the description thus provided, conducting an auction for the document service, the auction including the steps of submitting a bid for the document service from a participant process, receiving bidding information in the broker process, the received bidding information including the submitted bid, attempting with the broker process to automatically establish a price determined by the broker process for the document service responsively to the received bidding information, and if said price can be established by the broker process for the document service upon completion of the attempting step, establishing said price for the document service with the broker process;

said supplier bidding said established price initiating the performance of said document service over said computer network.

21. The method of claim 20 wherein the step of providing a description of a document service comprises providing a description of a document service including a document service selected from the group consisting of printing, copying, scanning, interpretation, text recognition, image recognition, editing, reproduction, binding, colorization, transmission, mailing, storage, retrieval, conversion, authentication, searching, shredding, recycling, and disposal.

* * * * *